Patented Mar. 15, 1949

2,464,512

UNITED STATES PATENT OFFICE 2,464,512

PRESERVING FLOWERS AND FOLIAGE

Philip Joffe, New York, N. Y., assignor, by mesne assignments, of fifty per cent to Sidney Joffe and fifty per cent to Philip M. Joffe, both of Paterson, N. J.

No Drawing. Application April 12, 1946, Serial No. 661,908

2 Claims. (Cl. 117—3)

My invention relates to a new and improved method of preserving flowers and foliage, and new and preserved flowers and foliage.

My invention relates particularly to the preservation of flowers in their natural form and color. This is a particularly difficult problem, especially if the flowers are not absolutely fresh.

If a flower which contains natural water in its cell structure is saturated with an anhydrous solution of a color preservative, such as a solution of salicylic acid in 99% isopropyl alcohol, the flower permanently loses its natural form after a relatively short period. This period depends upon the type of flower and its freshness.

If a flower which has not been treated with said solution, is immersed in a fused compound such as fused paradichlorobenzene or fused phenyl salicylate, the flower also permanently loses its natural form, if the immersion is too long. If the immersion period is properly regulated, the adherent fused material must solidify quickly upon the flower after it has been withdrawn from the fused mass, or else the flower cannot support the weight of the adherent material while it is in the fused state, and the flower permanently loses its natural shape. If the adherent fused material is solidified on the flower in a sufficiently short period of time, the solidified material sets the flower permanently into its natural form, during a period in which the flower is dried and the adherent solidified material is removed by sublimation. The flower is dried before the solidified material is removed by sublimation.

I have discovered that if a flower which contains natural water in its cell structure is saturated or impregnated with a solution of salicylic acid in anhydrous isopropyl alcohol, and the saturated or impregnated flower is promptly immersed in a fused bath of paradichlorobenzene or phenyl salicylate, before the flower loses its natural form, and the period of immersion is regulated according to the type of flower and its freshness, these two steps are correlated to produce a greatly improved result.

The saturation or impregnation with said solution increases the body of the flower, and renders it more durable and resistant to flexing.

The flower is thus impregnated or saturated with said solution at room temperature of 20° C.–25° C. or below, and the saturated flower is at 20° C.–25° C. or below when it is immersed in the fused material. If the fused material is paradichlorobenzene, said fused material is maintained slightly above its melting point of 53° C.

The period of immersion is short, in the range of 1–5 seconds, depending upon the type of flower and its freshness. If the petals are thick and the flower has substantially all of its natural water in its cell structure, the period of immersion is longer than if the petals are thin or if the flower has lost a substantial percentage of its natural water.

The temperature of the immersed flower is thus maintained below the temperature of the fused paradichlorobenzene during the immersion. When the flower is impregnated or saturated with the isopropyl alcohol, said alcohol mixes in the cell structure of the flower with the natural water which is in said cell structure. During the immersion, the mixed liquid in the cell structure of the flower evaporates more readily and rapidly than if the flower contained only natural water in its cell structure, thus effectively cooling the flower during its immersion, and keeping the temperature of the flower below the temperature of the fused material.

When the flower is withdrawn from the fused mass, the flower is effectively cooled by the vaporization of the alcohol which remains in its cell structure, thus rapidly solidifying the adhering fused paradichlorobenzene. The vaporization of the alcohol also keeps the cell structure clear from the penetration of the fused material.

By combining these two steps in said sequence, I am able to secure a more uniform and reliable and much better result than by immersing an untreated flower directly in the fused material.

I also preserve the color of the flower more effectively, and I prevent the formation of a film of the color preservative upon the surface of the flower. Such film mars the appearance of the flower.

After the flower has been wholly dried and its adherent solidified coating has been sublimed, I immerse the flower in an emulsion of glycerine with a solution of pyroxylin in acetone. Since the dried flower is now substantially free from liquid in its cell structure, the emulsion readily penetrates the cell structure. When the acetone is removed by evaporation, glycerine and deposited pyroxylin remain in the cell structure of the flower, and the surface of the flower has a protective coating of dry pyroxylin. The finished flower is durable, flexible, and resilient.

I thus produce a finished preserved flower which can withstand the necessary commercial handling in using such preserved flowers in millinery and for many other purposes.

It has been proposed in U. S. Patent No. 1,935,706 patented November 21, 1933, to immerse the natural flower, without pre-treatment, in a fused bath of camphor, $C_{19}H_{16}CO$; naphthalene, $C_{10}H_8$; chloral hydrate, $CCl_3CH(OH)_2$; terpine hydrate, $C_{10}H_2O_2.H_2O$; thymol,

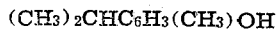

phenyl salicylate, $C_6H_4OHCOOC_6H_5$; and paradichlorobenzene, $C_6H_4Cl_2$. It has also been proposed to dissolve color preservatives in such fused materials, such as salicylic acid, $C_6H_4.OH.COOH$; and benzoic acid, $C_6H_5.COOH$.

Such application of the color preservative sometimes produced a surface coating thereof on the flower, which is objectionable. This step, and the subsequent reinforcing step disclosed in said patent, often resulted in a fragile finished specimen, if the initial flower was not fresh, so that it had little natural water in its cell structure.

The above general disclosure of my invention is only illustrative, and the invention is not limited thereto in any manner.

Additional objects and advantages of my invention will be disclosed in the annexed description, which discloses a detailed preferred example, to which the invention is not limited. I disclose a three-step process which is applicable to flowers and foliage, and I also disclose a one-step process, which is applicable to foliage. I include evergreens in the designation "foliage."

The details of the invention will vary according to the type of flower and foliage. The specific directions stated in the example, apply to an American Beauty rose.

First step

I impregnate or saturate the flower, at ordinary room temperature of 20° C.–25° C. or below, with a liquid which is more readily and rapidly evaporated than water. This liquid is preferably anhydrous, although the invention is not limited thereto. Isopropyl alcohol $(CH_3)_2CHOH$, is preferred, as it is highly selective for the desired purpose. I prefer to use the 99% grade of isopropyl alcohol, which is substantially anhydrous. I can use the 91% grade of isopropyl alcohol, which does not contain more than 12.5% of water by weight.

I can also use ethanol, methanol, benzine, benzol, acetone, etc.

A suitable color preservative, which is optionally solid at ordinary room temperature, is dissolved in the impregnating or saturating liquid. I can use salicylic acid, its esters such as acetylsalicylic acid, benzoic acid, etc. These color preservatives with the exception of acetylsalicylic acid are well-known. I can use any color preservative. I can use all derivatives of salicylic acid.

I prefer to use a solution of salicylic acid in 99% grade isopropyl alcohol. This solution contains from 8–32 grains of salicylic acid per fluid ounce of said solvent. This corresponds to a 2.2%–8.8% solution by weight. This solution is highly selective. A more concentrated solution is less desirable, because it may deposit excess salicylic acid upon the surface of the flower. The specimen is immersed in this solution during an immersion period of 1–5 seconds. The temperature of the solution may be 20° C.–25° C. or less. The cell structure of the specimen is preferably saturated to a maximum with this solution.

This solution or its solvent liquid may be applied by spraying, brushing, or by any form of application. This applies to the application of any liquid material in any step in the process.

The thoroughly saturated specimen is removed, and excess liquid or solution is removed by gentle shaking.

This wholly saturated specimen is used in the second step, before the cell structure has been injured by said liquid or solution, and before the flower has lost its form. The delay may be 10–15 seconds. The saturated specimen preferably retains all of the natural water and substantially all of the absorbed saturating liquid in its cell structure, when the specimen is subjected to the second step.

Second step

I prefer to use a fused material which can sublime at 20° C.–25° C. at ordinary pressure of 760 millimeters of mercury, and which fuses below 100° C. I can use any of the previously-mentioned fusible materials. The invention is not limited to any specific coating material.

I prefer to use paradichlorobenzene, which fuses at 53° C. This fused material is kept slightly above its melting point. The pressure is normal pressure of 760 millimeters of mercury.

The thoroughly saturated specimen, at a temperature of 20° C.–25° C. or less, is quickly immersed in the fused bath. The immersion period is 1–5 seconds, depending upon the type of flower. The stalk and foliage of the flower may optionally be also immersed.

After the end of the immersion period, the specimen is withdrawn into an atmosphere whose temperature is 20° C.–25° C. or less. The adherent fused material rapidly solidifies on the flower.

The specimen is then supported at the end of its stalk, optionally in inverted position, in an atmosphere at ordinary room temperature and at normal pressure.

All or substantially all the liquid is evaporated from the cell structure. At least the major part of the liquid is evaporated. While the liquid is thus evaporated, the adherent and solidified coating of the fusible material sublimes. The flower is dried before the solidified coating has been wholly removed by sublimation. The solid coating is permeable to the vapor of the liquid in the cell structure. This permeability is improved by the pre-treatment of the first step. The specimen is thus held until all or substantially all of said fusible material has sublimed.

The drying and the sublimation can be accelerated by the use of a higher temperature and a lower pressure, using a desiccating atmosphere, etc.

After the specimen has been dried, remaining solidified surface material may be removed by a solvent which is applied by a brush or other applicator, so as to prevent any substantial penetration of the solvent for the surface material into the cell structure of the dry specimen. If such solvent is used, it is eliminated by evaporation. The complete removal of the adherent solidified coating by sublimation may take several days.

The dry specimen is now reinforced in the third step, so that the specimen is durable and flexible and it can withstand commercial handling, as in making millinery and other decorative materials.

Third step

I make an emulsion from glycerine, acetone, and a viscous and paste-like pyroxylin cement.

This cement is of the well-known household type. It consists essentially of a solution of 10%–20% or more by weight of pyroxylin in acetone. It contains plasticizer, diluents for the acetone, etc. Since such cement is well-known, it requires no detailed description.

Equal volumes of this cement and acetone are mixed at 20° C.–25° C., to produce a flowable liquid. This liquid is mixed with glycerine, in the proportion of half the volume of the cement. This can be done at 20° C.–25° C., by vigorous shaking or mixing.

A milky-white emulsion is thus formed. This emulsion remains stable at normal room temperature, during a stable period of at least 30 minutes.

If this emulsion is kept in a jar at 20° C.–25° C., it breaks. The glycerine finally forms a bottom layer in the jar, and the solution of the pyroxylin in the acetone, possibly containing some of the glycerine, forms a top layer.

The specimen is immersed in the emulsion at 20° C.–25° C., during an immersion period of 1–5 seconds.

The temperature of the spcimen is optionally the same as the temperature of the emulsion, when the specimen is immersed in the emulsion.

The specimen is then withdrawn from the emulsion, into an atmosphere at normal room temperature. The specimen is optionally gently shaken, in order to remove excess surface emulsion.

The specimen, optionally inverted, is kept at ordinary room temperature, until the acetone has evaporated. The pyroxylin on the surface of the specimen then has a dry feel, if the percentage of glycerine has been properly selected.

The cell structure of a flower is more permeable than the cell structure of foliage.

The cell structure of a flower will absorb a substantial amount of the emulsion. When the acetone has evaporated, said cell structure will be substantially saturated with glycerine and it will also contain a substantial amount of pyroxylin, thus reinforcing the cell structure, especially adjacent the surface of the flower. The flower is thus impregnated and coated with the pyroxylin.

The cell structure of foliage will also absorb some glycerine and some of the dissolved pyroxylin, so that such cell structure will also be reinforced with the pyroxylin, in addition to the surface coating of pyroxylin.

The evaporation of the acetone can be accelerated by using an elevated temperature or a reduced pressure.

One-step treatment of foliage

The term "foliage" includes evergreens.

The foliage specimen, which is preferably fresh, is directly immersed in the emulsion used in the third step, at ordinary room temperature. The specimen is at said room temperature when it is immersed, and it is withdrawn into an atmosphere at room temperature. The glycerine is absorbed to some extent in the cell structure, and some of the emulsion is also absorbed.

The immersion period is ordinarily 1–5 seconds.

The specimen is then dehydrated and the acetone is evaporated, at ordinary room temperature. The surface coating should have a dry feel, which indicates that it does not have an undesirable excess of glycerine. This coating is permeable to water vapor, so that the specimen can be thoroughly dehydrated.

In every case, the finished specimen is preferably wholly dehydrated or substantially wholly dehydrated, so that it retains little or none of its natural water. The specimens can thus be kept for a very long period. Their cell structure is impregnated or saturated with glycerine or other suitable liquid, which is not lost by evaporation under ordinary conditions.

Certain types of foliage may be immersed, in this one-step process, for one hour or more.

I can process other biological specimens, such as insects, animal tissue, etc.

The scope of my invention includes any color preservative and any solvent for the same, including a solvent which is aqueous or substantially anhydrous.

Instead of using an impregnating or coating cellulose ester such as cellulose nitrate, I can use the cellulose ethers, such as ethyl cellulose or benzyl cellulose, and other coating materials in the form of an emulsion which has a liquid ingredient which can penetrate the cell structure of the specimen, or which wets the specimen and forms an adherent liquid coating thereon. I can use cellulose esters other than cellulose nitrate, such as cellulose acetate.

Instead of using glycerol in said emulsion, I can use the glycols, such as ethylene glycol, and other substances which can form said emulsion, and which preferably do not evaporate at ordinary room temperature.

I thus use a liquid ingredient in said emulsion which remains after the solvent for the plastic has evaporated, and which is optionally hygroscopic and helps to reduce the brittleness of the preserved specimen.

In one aspect of my invention, I impregnate a specimen which contains water, with an impregnating liquid which is preferably, but not necessarily, more easily evaporated than water. Said impregnating liquid is preferably, but not necessarily, freely miscible with water. Said impregnating liquid preferably, but not necessarily, has a color preservative dissolved therein, said color preservative being preferably, but not necessarily, a solid at ordinary room temperature of 20° C.–25° C. I can use a single impregnating liquid, or the liquid impregnating material can be a mixture.

I then apply to said impregnated specimen, a fused composition which may be a single substance of a mixture. This application of the fused composition retains and sets the specimen in its natural form. The use of the fused composition preferably, but not necessarily, leaves some water and possibly some liquid impregnating material in the specimen, when the fused composition has been solidified to form a solid surface coating. This solid surface coating is preferably crystalline.

I then eliminate or substantially eliminate the water by evaporation from the specimen, and I also eliminate the solid coating by sublimation while setting the natural form of the specimen. In this step, I preferably, but not necessarily, also eliminate the impregnating liquid material by evaporation.

I then apply to the specimen, which is preferably free from liquid, an emulsion of a plastic, said emulsion being preferably unstable, although I do not limit the invention to the use of an unstable emulsion. This emulsion includes a liquid material, which may be a single substance or a mixture, which is absorbed by the cell structure of the specimen. The designation "plastic" includes resins. I thus impregnate the specimen, at least partially adjacent its surface, and I also preferably, but not necessarily, form a surface coating of the plastic, which optionally contains some of said liquid material. This surface coating may be continuous or non-continuous. The surface coating may directly abut the surface of the specimen, or the liquid impregnant of said emulsion may form a continuous or non-continuous intermediate film between the surface of the specimen and said surface coating. The liquid impregnant preferably has a high boiling point and it is substantially non-evaporative from the flower at ordinary room temperature of 20° C.–25° C.

My invention also separately includes the respective novel steps or sub-combinations of the complete method.

The specimen retains the desired shape, when its water and the isopropyl alcohol have been evaporated, because the salicylic acid or the like remains deposited in the cell structure of the flower.

The reinforcing coating of plastic may contain coloring matter, including metallic pigments and the like.

As an alternative, I can apply any decoration to this plastic coating, including a superposed decorative coating of any type.

While I have described preferred embodiments of my invention, numerous changes and omissions and additions can be made without departing from its scope.

Whenever I refer to a coating, said coating may be continuous or non-continuous. It may be permeable to water vapor because of its thinness, or because it has interstices.

When I refer to applying reinforcing material to the specimen to provide a reinforcing coating, I include a step in which said reinforcing material may or may not be absorbed by the cell structure.

I can use a mixture of impregnating liquids, and a mixture of coating materials.

When I refer to impregnation of the cell structure this is not limited to the impregnation of the entire cell structure, as partial impregnation is within the scope of my invention.

The invention is not limited to the use of an emulsified reinforcing composition or to the use of any reinforcing composition. Thus, if the specimen is not handled roughly, the reinforcement is not required.

When I refer to the use of a liquid which has a lower boiling point than water, I include the use of a liquid which may contain a small percentage of glycerine or the like, as long as said liquid is evaporated more readily than water, under the conditions described herein. Said saturating liquid may contain some water.

When a flower or foliage is not absolutely fresh, it has lost some of the original water content of the cell structure. This results in a shrinkage of the original cell structure. The use of isopropyl alcohol is preferred, because it very rapidly fills out the cell structure of the fresh specimen.

Water is the major ingredient by weight of active plant protoplasm. In the living cell, the water comprises 70%–95% of the weight of the substance. The average proportion is usually 85%–90%. When the percentage of liquid is increased, the turgidity or turgor of the plant protoplasm is increased. When water is lost, the "swollen" condition of the protoplasm is decreased, so that the tissue becomes soft and flabby.

According to my invention, I swell the plant cells, so as to make the tissue stiff and turgid, and resistant to the subsequent treatment.

Thus, as one illustrative example, I treated two fresh carnations whose total weight was 240 grains. After dipping these flowers into the isopropyl alcohol and gently shaking off surplus isopropyl alcohol, the weight of the specimens was increased to 320 grains, or about one-third.

After immersion in the para-dichlorobenzene, and upon removing the specimens from the molten bath and permitting the molten para-dichlorobenzene to solidify rapidly, and before any sublimation, the weight of the specimens was 1200 grains. These specimens were held at ordinary room temperature of 20° C.–25° C., at normal atmospheric pressure, during a period of 7–10 days, until substantially all the para-dichlorobenzene had sublimed. Their weight then was 102 grains. This shows that the specimens were substantially thoroughly dehydrated during the period of sublimation.

After finishing with the emulsion according to the Third Step, the weight of these specimens was 132 grains.

The finished specimens are flexible and tough and resilient.

The finishing Third Step renders the flowers substantially waterproof, so that they do not readily absorb water vapor from humid air.

In treating certain types of flowers, I have found it advantageous to add the color preservative, both to the fused para-dichlorobenzene and the isopropyl alcohol or the like. Thus salicylic acid can be dissolved in the para-dichlorobenzene and also in the isopropyl alcohol. This is particularly advantageous for flowers which have heavy petals, such as roses. As an example, I use 4–5 grains of salicylic acid, per ounce of para-dichlorobenzene.

By dissolving a color preservative in a liquid, such as isopropyl alcohol, which swells the cells, I preserve the color in the interior of the cells of the specimen. When a color preservative is used in the fused coating material, such color preservative acts substantially only upon the surface cells. Hence it is a decided improvement to use the color preservative in both the first and second steps, in treating many classes of flowers, and to use the color preservative in the first step, in treating all classes of flowers.

While I prefer to use a coating material which can wholly sublime, I can also use a coating material such as phenyl salicylate, which leaves a very thin and substantially transparent coating. Since phenyl salicylate fuses at about 42° C., I can treat delicate flowers with phenyl salicylate, because of its low melting point, said material being kept fused at or slightly above its melting point.

An important feature is the improved preservation of the color of the flower. According to U. S. Patent No. 1,937,706, the proportion of color preservative which could be used, when dissolved in the fused coating composition, was necessarily very slight. An excess of color preservative not only produced an objectionable surface coating on the flower, after the surface material had sublimed, but it also retarded the rate of sublimation. By dissolving the color preservative in a non-aqueous liquid which penetrates and swells the cell-structure of the flower, I can use a much larger proportion, up to 1000% of the maximum proportion which can be dissolved in the fused coating composition. I thus greatly enhance the preservation of the color of the flower, and I eliminate the objectionable retardation of the rate of sublimation.

I claim:

1. A method of preserving in its natural form a biological specimen which has a cell structure which contains original water, which consists in substantially wholly saturating said cell structure with isopropyl alcohol while retaining substantially all of said original water in said specimen and thus swelling said cell structure and increasing the original weight of said specimen, then applying fused paradichlorobenzene to said swelled specimen to coat said swelled specimen with fused paradichlorobenzene while evaporating at least some of said isopropyl alcohol from said swelled specimen, solidifying said fused paradichlorobenzene on said swell specimen, said paradichlorobenzene being thus applied in fused form and being solidified while said cell structure is thus swelled and the weight of said specimen is in excess of its original weight, and then substantially evaporating said original water and said isopropyl alcohol from said swelled specimen while the shape of said specimen is maintained by the solidified paradichlorobenzene.

2. A method according to claim 1, in which a color preservative for the color of said specimen is dissolved in said isopropyl alcohol, the concentration of the solution of said color preservative in the isopropyl alcohol being sufficiently low to confine said color preservative substantially wholly to the interior of said cell structure when said water and said isopropyl alcohol have evaporated.

PHILIP JOFFE.

REFERENCES CITED

The following references are of record in the file of this patent:

UNITED STATES PATENTS

| Number | Name | Date |
|---|---|---|
| 547,227 | Pfitzer | Oct. 1, 1895 |
| 1,076,786 | Reinherz | Oct. 28, 1913 |
| 1,935,706 | Joffe | Nov. 21, 1933 |